United States Patent [19]  [11] 4,090,406
Rodder  [45] May 23, 1978

[54] SENSOR

[76] Inventor: Jerome A. Rodder, 774 Sunshine Dr., Los Altos, Calif. 94022

[21] Appl. No.: 809,303

[22] Filed: Jun. 23, 1977

[51] Int. Cl.² .......................... G01B 13/12; G01F 1/68
[52] U.S. Cl. ....................................... 73/204; 73/37.5; 128/2.08; 73/755
[58] Field of Search .................. 73/37.5, 204, 399; 128/2.08

[56] References Cited

U.S. PATENT DOCUMENTS

| 3,091,113 | 5/1963 | Nerbeim | 73/204 X |
| 3,452,595 | 7/1969 | Auger | 73/204 |
| 3,949,739 | 4/1976 | Rodder | 73/204 |

Primary Examiner—Herbert Goldstein
Attorney, Agent, or Firm—Christie, Parker & Hale

[57] ABSTRACT

First and second elongated conduits each have an inlet and an outlet. First and second resistive elements having a resistance related to their temperature are disposed in the first and second conduits, respectively, in heat transfer relationship with gas flowing therethrough. A mixture of a first gas and a second gas having a different thermal conductivity than the first gas is supplied to the inlet of the first conduit in a fixed ratio. A mixture of the first and second gases is supplied to the inlet of the second conduit in a variable ratio related to a variable pressure to which a branch of a T-network is exposed. The sensor is specifically employed as a flowmeter, a micrometer, or a pressure sensor.

12 Claims, 3 Drawing Figures

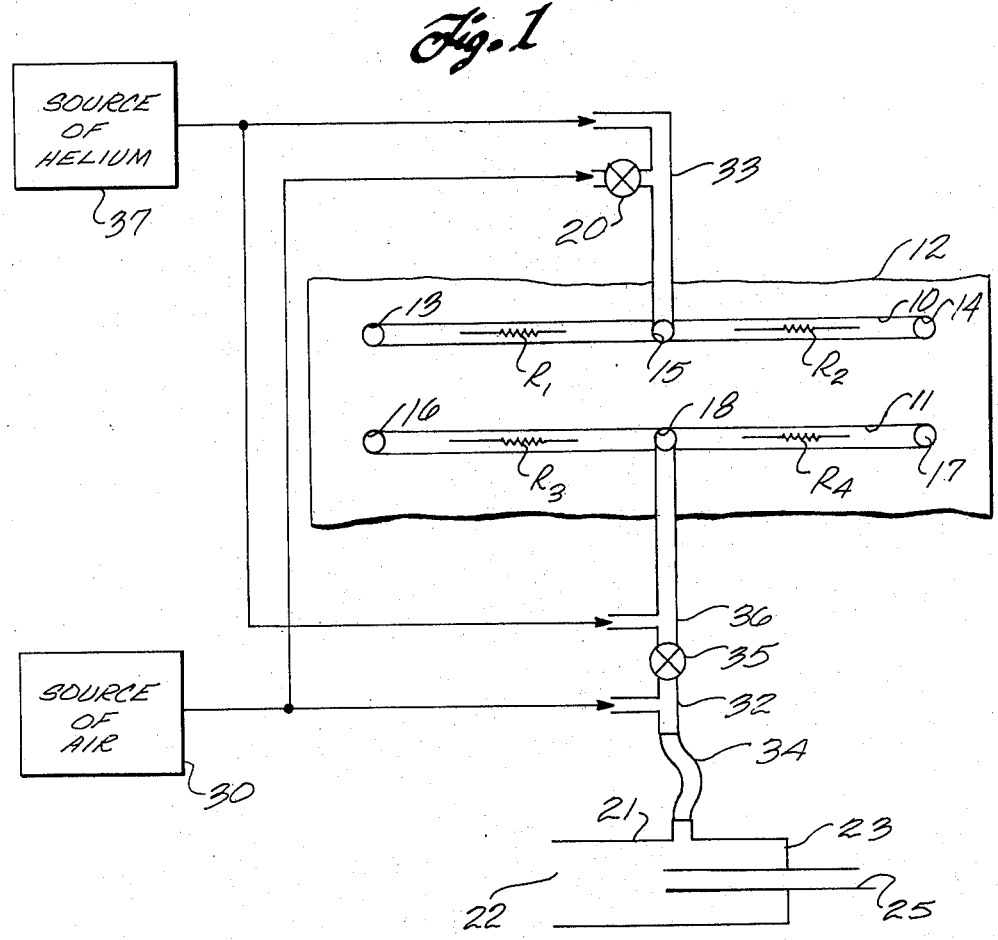
Fig. 1
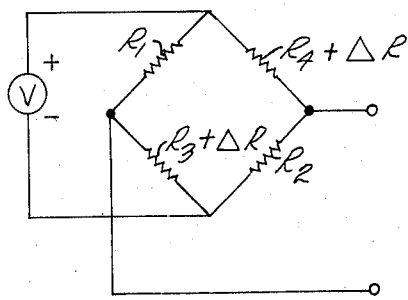
Fig. 2
Fig. 3

SENSOR

BACKGROUND OF THE INVENTION

This invention relates to sensitive instruments and, more particularly, to a fluid responsive instrument that can be used as a pressure sensor, a flowmeter, or a micrometer among other applications.

In a hot wire anemometer, the hot wire is connected to serve as one arm of an electrical bridge circuit. Current passing through the hot wire heats the wire, thereby increasing its resistance. The hot wire is disposed in an elongated cavity through which the gas to be measured flows and cools the hot wire accordingly. If the type of gas passing through the cavity is known, the resistance change of the hot wire is a measure of the gas flow rate. If the flow rate of the gas passing through the cavity is known, the resistance change of the hot wire is a measure of the thermal conductivity of the gas and, hence, the gas type.

My U.S. Pat. No. 3,971,247, which issued July 27, 1976, discloses a thin elongated hot wire bent in half to extend along the length of a cavity formed in a housing. The ends of the hot wire are soldered to pads on a printed circuit board located at one end of the cavity for support and electrical connection to a bridge circuit. The middle of the hot wire is wrapped around a rod at the other end of the cavity for support. The rod is deformed to exert tension on the hot wire as its length changes. Thus, for a cavity having a given length, the length of the hot wire can be doubled and a corresponding increase in sensitivity can be achieved. But, the probability of a short circuit by contact between halves of the hot wire or the hot wire and the sides of the cavity rises, as the length of the cavity increases. This type of flowmeter is capable of responding rapidly to changes in gas flow, i.e., responding to a change from zero to peak voltage in the order of a hundred milliseconds. However, to generate signal voltages greater than 500 millivolts, a gas flow of 1.5 liters per minute, or greater, past the hot wire is required. Such large gas flow introduces turbulence, which increases the probability of a short circuit of the hot wire and a noisy signal.

SUMMARY OF THE INVENTION

The invention permits the generation of large signal changes with low fluid flow, albeit at the expense of the speed of response. First and second resistive elements having a resistance related to their temperature are disposed in first and second conduits, respectively, in heat transfer relationship with fluid flowing therethrough. A mixture of a first fluid and a second fluid having a different thermal conductivity than the first fluid is supplied to the first conduit at a fixed ratio between 0 and 100% of one of the fluids. A mixture of the first and second fluids is supplied to the second conduit in a variable ratio related to a variable pressure to which one branch of a T-network is exposed. The difference in the resistance of the first and second resistive elements is sensed to provide an indication of the variable pressure.

BRIEF DESCRIPTION OF THE DRAWING

The features of specific embodiments of the best mode contemplated of carrying out the invention are illustrated in the drawing, in which:

FIG. 1 is a schematic diagram of a spirometer incorporating the principles of the invention;

FIG. 2 is an electrical schematic diagram depicting the electrical connections of the hot wires in the flowmeter of FIG. 1, and FIG. 3 is a schematic diagram of a micrometer employing the principles of the invention.

DETAILED DESCRIPTION OF THE SPECIFIC EMBODIMENTS

The disclosures of my U.S. Pat. No. 3,971,247, which issued July 27, 1976, my application Ser. No. 787,467 and application Ser. No. 787,468, which were both filed on Apr. 14, 1977, are incorporated herein by reference.

In FIG. 1, an elongated conduit 10 and an elongated conduit 11 are formed in a housing 12 made of a material having high thermal conductivity such as aluminum or steel to make the apparatus thermally stable. Conduit 10 has ports 13 and 14 at its ends and a port 15 midway between ports 13 and 14 to form a pair of flow passages. Conduit 11 has ports 16 and 17 at its ends and a port 18 midway between ports 16 and 17 to form another pair of flow passages. A blow tube or breath transmission passage 21 has an end 22 open to the atmosphere and a closed end 23. A tube 25 having a substantially smaller diameter than breath transmission passage 21 passes through end 23 and opens to the atmosphere. Tube 25 serves as a restriction on gas blown into end 22 of breath transmission passage 21.

A source of air 30, which supplies air at a low flow rate, e.g. 3 to 5 scc/sec., is connected to a first arm of a T-network 32 and a first arm of a T-network 33, in which an adjustable needle valve 20 is located. A second arm of T-network 32 is connected by a section of flexible tubing 34 to breath transmission passage 21 near the restriction, i.e., between the end of tube 25 and end 23, as illustrated in FIG. 1, where the gas velocity is low and thus the turbulence is small. Flexible tubing 34 permits breath transmission passage 21 to be moved about while maintaining communication with housing 12, which is stationary. A third arm of T-network 32 is connected through an adjustable needle valve 35 to a first arm of a T-network 36.

A second arm of T-network 33 is connected to port 15, and a second arm of T-network 36 is connected to port 18. A source of helium 37, which supplies helium at a low flow rate, e.g. 1.5scc/sec., to each of ports 15 and 18 is connected to a third arm of T-network 33 and a third arm of T-network 36.

A hot wire $R_1$ extends along the length of the flow passage between ports 15 and 13, a hot wire $R_2$ extends along the length of the flow passage between ports 15 and 14, a hot wire $R_3$ extends along the length of the flow passage between ports 18 and 16, and a hot wire $R_4$ extends along the length of the flow passage between ports 18 and 17. Ports 13, 14, 16 and 17 are open to the atmosphere.

Air and helium from sources 30 and 37 are mixed in T-network 33 and supplied thereby to port 15. Helium has a relatively high coefficient of thermal conductivity and air has a relatively low coefficient of thermal conductivity. This air helium mixture flows slowly past hot wires $R_1$ and $R_2$ to ports 13 and 14, respectively, to cool hot wires $R_1$ and $R_2$ by an amount depending primarily upon the ratio of air to helium in the mixture. Similarly, air and helium from sources 30 and 37 are mixed in T-network 36 and supplied thereby to port 18. The mixture flows slowly past hot wires $R_3$ and $R_4$ to ports 16 and 17, respectively, to cool hot wires $R_3$ and $R_4$ by an amount depending primarily upon the ratio of air to helium in the mixture.

In operation, as gas flows into end 22 of breath transmission passage 21 the static pressure in the second arm of T-network 32 rises by an amount depending upon the rate of gas flow in passage 21. As a result, more of the air from source 30 flows through valve 35 to T-network 36 for mixture with helium, and the air to helium ratio of the mixture increases. The increase in the air to helium ratio in turn decreases the cooling of hot wires $R_3$ and $R_4$ and increases the temperature thereof.

As shown in FIG. 2, hot wires $R_1$ through $R_4$ serve as arms of an electrical bridge. Hot wires $R_1$ and $R_3$ are connected in series between the output terminals of a voltage source V, with hot wire $R_1$ connected to the positive output terminal and hot wire $R_3$ connected to the negative output terminal. Hot wires $R_2$ and $R_4$ are connected in series between the output terminals of voltage source V with hot wire $R_4$ connected to the positive output terminal and hot wire $R_2$ connected to the negative output terminal. The output of the bridge appears between the junction of hot wires $R_1$ and $R_3$ and the junction of hot wires $R_2$ and $R_4$.

As the ratio of air to helium in the mixture flowing through conduit 11 increases and the temperature of hot wires $R_3$ and $R_4$ increases, the resistance of hot wires $R_3$ and $R_4$ increases as represented by the plus sign in FIG. 2. The resulting voltage at the bridge output thus represents the flow rate of the breath blown into end 22 of passage 21.

Prior to making a breath flow rate measurement, needle valve 35 is first adjusted to supply to port 18 a mixture with a small air to helium ratio, e.g., about 10%, then needle valve 20 is adjusted until the bridge output is balanced.

Alternatively, pure helium could be supplied to conduit 10, i.e., the air to helium ratio of the mixture could be zero, in which case it would not be possible to carry out the described bridge balancing procedure prior to measurement.

By varying the thermal conductivity of the gas passing through conduit 11 in the described manner rather than the flow rate, the apparatus of FIG. 1 measures the flow rate through passage 21 by the technique used in gas chromatography, i.e. by measuring the changing thermal conductivity of the gas mixture flowing through conduit 10 rather than the flow rate thereof.

The flow rates of the air and helium are so low that the change in the flow rate of the mixture supplied to port 18 as more of the air from T-network 32 passes to T-network 36 rather than to breath transmission passage 21 has negligible cooling effect upon hot wires $R_3$ and $R_4$ relative to the cooling effect thereon due to the change in the air to helium ratio.

The apparatus described in connection with FIG. 1 could also be employed as a pressure sensor, in which case the second arm of T-network 32 would be connected to the region where the pressure is to be sensed.

Another application of the apparatus in FIG. 1 is as a micrometer, which is illustrated in FIG. 3. Instead of opening into breath transmission passage 21, flexible tubing 34 passes through a stationary micrometer element 37. The end of flexible tubing 34 is flush with a flat face 38 of micrometer element 37. A micrometer element 39 has a flat face 40 parallel to face 38. Micrometer element 39 is movable toward and away from micrometer element 37 to vary the gap, designated X, between faces 38 and 40. As gap X, which is typically of the order of several thousandths of an inch, is varied, the air pressure in flexible tubing 34 changes to generate a voltage across the bridge output in the manner described above in connection with FIGS. 1 and 2. Specifically, if gap X increases, the air to helium ratio of the mixture supplied to port 18 decreases and vice versa. This micrometer is sensitive enough to sense changes in gap X of the order of millionths of an inch.

The described apparatus achieves high sensitivity. In the limiting case of a change in the mixture flowing through conduit 11 from 100% helium to 100% air, the change in voltage across the bridge output is typically of the order of 3 volts. Assuming a stability of 0.1 millivolts for the electrical bridge, a range of 10,000 units is easily achievable. On the other hand, the response to changes in flow rate is relatively slow, i.e., of the order of 1 to 2 seconds, depending upon the air and helium flow rate.

The described embodiments of the invention are only considered to be preferred and illustrative of the inventive concept. The scope of the invention is not to be restricted to such emboidments. Various and numerous other arrangements may be devised by one skilled in the art without departing from the spirit and scope of this invention as defined in the following claims. For example, instead of hot wires other types of resistive elements having a resistance related to temperature could be employed, such as thermistor beads. Instead of helium and air other gases could be used; for maximum sensitivity the gases should have as large a difference in coefficient of thermal conductivity as possible. Further, the invention can be practiced in connection with the features disclosed and claimed in my above referenced patent and application Ser. No. 787,468, particularly the means to support the hot wires.

What is claimed is:

1. A sensor comprising:

a first elongated conduit having an inlet and an outlet;

a first resistive element having a resistance related to its temperature disposed in the first conduit in heat transfer relationship with fluid flowing therethrough;

a second elongated conduit having an inlet and an outlet;

a second resistive element having a resistance related to its temperature disposed in the second conduit in heat transfer relationship with fluid flowing therethrough;

a source of a first fluid;

a source of a second fluid having a different thermal conductivity than the first fluid;

first fluid mixing means interconnecting one or both of the sources to the inlet of the first conduit to supply a mixture of the first and second fluids in a fixed ratio between 0 and 100% of one of the fluids to the first conduit;

second fluid mixing means interconnecting the source of the first fluid to the inlet of the second conduit;

a T-network having a first arm connected to the source of the second fluid a second arm with an outlet exposed to a variable pressure, and a third arm connected to the second mixing means to supply to the second conduit a mixture of the first and second fluids in a variable ratio related to the variable pressure; and means for sensing the difference in the resistance of the first and second resistive elements.

2. The sensor of claim 1, additionally comprising a blow tube having a restriction and a port near the restriction, the outlet of the second arm of the T-network being connected to the port.

3. The sensor of claim 1, additionally comprising a stationary micrometer element having a flat face flush with the outlet of the second arm and a movable micrometer element having a flat face facing the outlet of the second arm, the pressure in second arm branch varying as a function of the spacing between the flat faces of the micrometer elements.

4. The sensor of claim 1, in which the first fluid is a gas having high thermal conductivity.

5. The sensor of claim 4, in which the first fluid is helium.

6. The sensor of claim 4, in which the second fluid is a gas having low thermal conductivity.

7. The sensor of claim 6, in which the second fluid is air.

8. The sensor of claim 1, in which the second fluid is a gas having low thermal conductivity.

9. The sensor of claim 8, in which the second fluid is air.

10. The sensor of claim 1, in which both of the sources are interconnected to the first gas mixing means to supply a mixture of the first and second fluids in a fixed ratio greater than 0 and less than 100% of the one fluid.

11. The sensor of claim 1, in which the resistive elements are hot wires and the sensing means comprises first and second resistors, a source of electrical excitation energy having first and second output terminals, means for connecting the first hot wire and the first resistor in series with the first hot wire connected to the first output terminal and the first resistor connected to the second output terminal, means for connecting the second hot wire and the second resistor in series with the second resistor connected to the second output terminal and the second hot wire connected to the first output terminal, whereby the first and second hot wires and the first and second resistors form a bridge having an output between the junction of the first hot wire and the first resistor and the junction of the second hot wire and the second resistor.

12. The sensor of claim 11, in which the first and second resistors comprise hot wires supported to extend along the first and second conduits, respectively.

* * * * *